United States Patent [19]

Albrecht et al.

[11] Patent Number: 4,597,784
[45] Date of Patent: Jul. 1, 1986

[54] INDUSTRIAL FILTER

[75] Inventors: Jiri Albrecht, Prague; Václav Mrstina, Brno, both of Czechoslovakia

[73] Assignee: MOTOTRANS narodny podnik, Banska Bystrica, Czechoslovakia

[21] Appl. No.: 697,328

[22] Filed: Feb. 1, 1985

[51] Int. Cl.$^4$ .............................................. B01D 46/00
[52] U.S. Cl. ........................................ 55/378; 55/302; 55/486; 55/508; 55/509; 55/528; 55/DIG. 12; 55/380; 55/381
[58] Field of Search ................. 55/302, 378, 380, 381, 55/486, 492, 508, 509, 523, 524, 528, DIG. 12

[56] References Cited

U.S. PATENT DOCUMENTS

| | | | |
|---|---|---|---|
| 3,800,510 | 4/1974 | Lamond | 55/509 X |
| 3,830,042 | 8/1974 | MacDonnell | 55/381 X |
| 3,853,510 | 12/1977 | Meyer et al. | 55/380 X |
| 4,080,185 | 3/1978 | Richter et al. | 55/381 X |
| 4,129,428 | 12/1978 | Andersson et al. | 55/509 X |
| 4,197,099 | 4/1980 | Lundberg | 55/378 |

FOREIGN PATENT DOCUMENTS 2425829  1/1980  France ............................... 55/378

Primary Examiner—Charles Hart

[57] ABSTRACT

Industrial filter for separating solid particles from a streaming gaseous medium the filter having a filter insert formed from a single band of knitted fabric. The filter insert is provided with a smooth permeable layer of amorphous synthetic polymeric material at least on its inlet inside. Longitudinal and transverse packing sleeves of the filter insert are secured to marginal surfaces of a partition wall by means of a pressure sealing frame. Single filter pockets are inserted in the openings of the partition wall and in place between single filter pockets the filter insert sliding rests upon internal surfaces of the partition wall. During operation a certain amount of separated dust is forced into the gaps between the internal surfaces of partition walls and parts of the filter insert surfaces supported by those internal surfaces. Whereby the accumulated dust layer automatically compensates for the stretching of the needled fabric. The filter insert is provided with internal and external spacers that are swingingly suspended or attached to the partition wall and which maintain required form of the filter insert.

8 Claims, 4 Drawing Figures

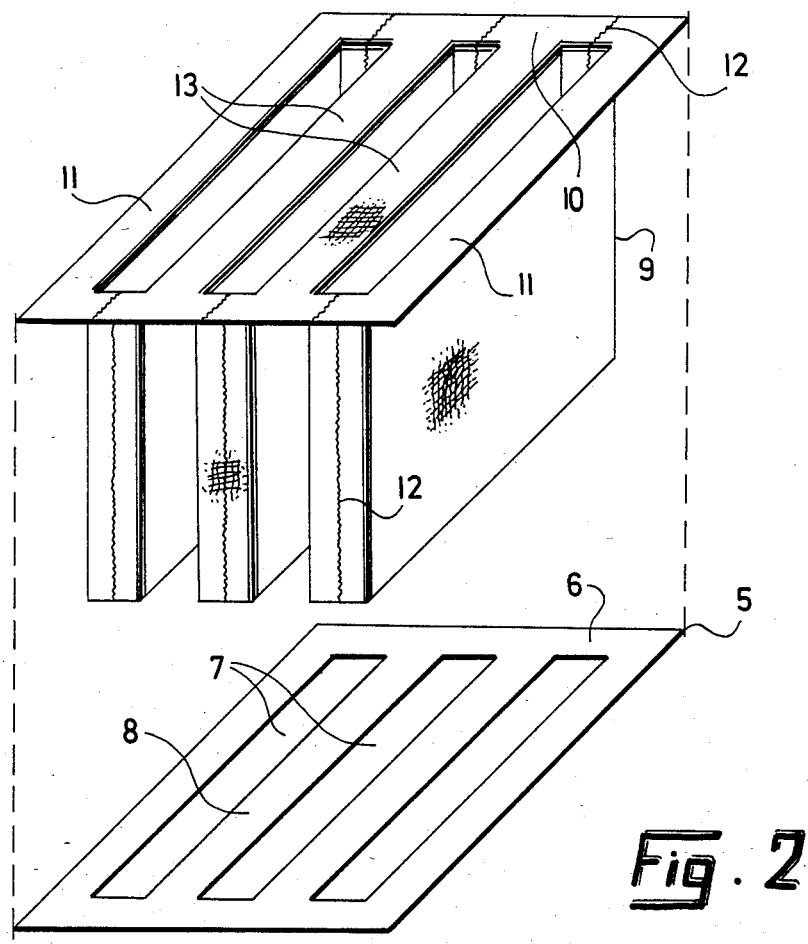
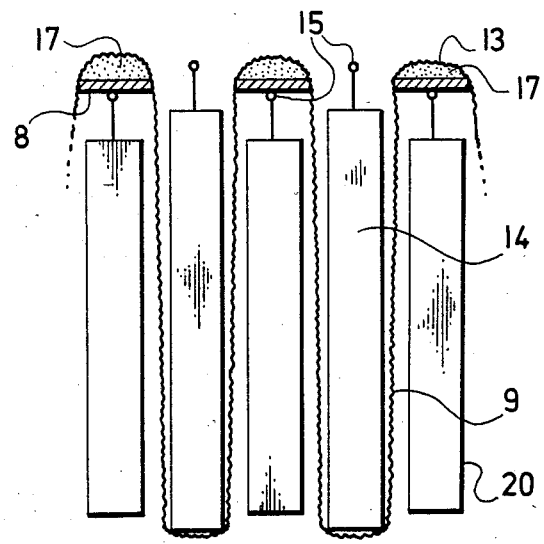

INDUSTRIAL FILTER

The invention relates to an industrial filter for separating solid particles from a streaming gaseous medium. It is provided with a multipocket filter insert whose stretching is automatically compensated for during operating.

In actually known industrial filters, various arrangements of a filter material are used; the shape of hoses or flat pockets is most frequently employed. During operation, when the collecting of solid components of gaseous medium on the filter material alternates with a regeneration of the material, the filter material is mechanically stressed, mainly in the longitudinal direction, which results in its stretching. This problem has increased with the introduction of knitted fabrics as filter material. Knitted fabrics are characterized by a higher filter efficiency, but they are less stretch resistant than earlier used filter cloths. Folds in the filter material that result from stretching causes increasing wear and lower service life of the material. An excessive stretch may even endanger the function of the filter.

Some types of filters are equipped with a special tensioning device for the additional tensioning of the filter cloth when it stretches during operation. The additional tensioning, although frequent with filter bags, is disadvantageous as it is laborious, requires continuous inspection of the filter bags, and can be performed only when the filter is out of operation.

In the tensioning of single pockets of known pocket filters is secured by means of springs or screws which raises production costs and beside, the amount of tension is relatively low. When tensioning filter cloth immediately after putting the filter into operation, the prestressing force shares unfavorably in the filter cloth stress during operation, and thus in the larger stretching of the filter cloth. Another disadvantage of known pocket filters must be mentioned; their inlet side surfaces are relatively rough and uneven so that removal of separated particles from the surfaces by scavenging is rather difficult and represents an increasing pressure loss of the filter.

It is an object of this invention to provide an industrial filter that automatically compensates for a stretching of the multipocket filter insert.

This industrial filter for separating solid particles from a streaming gaseous medium comprises a multipocket filter insert with inlet and outlet sides. The multipocket filter insert consists of a single band of a knitted fabric folded into a number of flat pockets, two longitudinal packing sleeves and two transverse packing sleeves as well as connecting parts between single pockets.

According to the invention, the multipocket filter insert is provided with a smooth permeable layer of amorphous synthetic polymeric material on the whole surface of at least one of its sides, i.e. the inlet side. Both the longitudinal and the transverse packing sleeves of the multipocket filter insert are fixed to the marginal surfaces of a partition wall of the filter by means of a pressure sealing frame, while the connecting parts of the multipocket filter insert slidably rested by their smooth permeable layers of amorphous synthetic polymeric material against the horizontal internal surfaces of the partition wall. Flat pockets inserted one by one in each opening of the partition wall are provided with internal spacers, while between single flat pockets external spacers are placed. Both the internal and the external spacers are swingingly suspended or attached to the partition wall by means of suspension elements. The internal surfaces of the partition wall have a width of from 2 cm up to 8 cm.

The multipocket filter insert is formed from a knitted fabric consisting of a ground cloth provided with a fibrous fleece at least on the filter insert inlet side, and a smooth permeable layer of amorphous synthetic polymeric material is created at least on the surface of the inlet side of the filter insert.

Two different types of the smooth permeable layer are possible. In the first case, it consists of polyester and/or polypropylene and/or polyacrylonitrile and/or aromatic polyamide, and on its internal side it may range from the amorphous state to the form of synthetic fibers creating at least a part of the knitted fabric structure of the multipocket filter insert. In the second case, the smooth permeable layer is formed by a polytetrafluoroethylene sheet fixed to the surface of the knitted fabric. The ground cloth in the knitted fabric is created from threads consisting of polyester and/or polypropylene and/or polyacrylonitrile and/or aromatic polyamide and/or glass. The fibers are either in staple or endless form.

The industrial filter according to the invention secures an automatic stretch limitation of a knitted fabric during a long-lasting operation. During alternating filtration and regeneration of the filter insert is connecting parts slide along internal surfaces of the partition wall with the simultaneous swing movement of spacers; a certain amount of separated dust is forced into the gaps between the internal surfaces of the partition wall and the connecting parts of the filter insert. The smooth permeable layer of amorphous synthetic polymeric material aids in the sliding of the connecting parts. Because successive filter insert stretchings, a compact layer formed from a part of separated dust forms in the gaps, and this compact dust layer compensates for the stretch of the filter insert. Long-lasting operation tests have shown that in this way the filter insert stretch can be compensated for up to 5%. The automatic tensioning of filter inserts has been demonstrated with different separated dusts with various granularities and specific weights. When the internal surface width of the partition wall is less than 2 cm, or more than 8 cm, or when the internal spacer attachment does not permit a swinging movement of the spacers and filter pockets, the automatic tensioning of filter insert does not ocur even if the filter insert surface is provided with a smooth permeable layer of amorphous synthetic polymeric material. Without a smooth permeable layer, however, the automatic tensioning of filter inserts also does not occur.

In comparison with existing installations, the industrial filter according to the invention requires no additional tensioning device, and besides, it needs neither additional tensioning when shutting down nor periodic inspection of the stretch of the filter insert. The smooth permeable layer at least on the filter insert inlet side facilitates the regeneration of the filter insert by air backwash. A well tensioned filter insert makes possible an easier separated dust release from the fabric surface; this results in a low pressure loss and hence energy savings. In addition, the automatic tensioning of filter inserts prevents the fold formation which causes the quick wearing of existing filter inserts and their consequent advantages have prolonged filter insert service life up to 20,000 operation hours, which is more than double the service life of known filters fabrics.

Exemplary embodiments of this invention are indicated in the accompanying drawings, wherein:

FIG. 2 is an exploded axonometric view of a folded filter insert with a partition wall;

FIG. 4 is a cross section through the fitted pockets and the partition wall.

Figure 1:
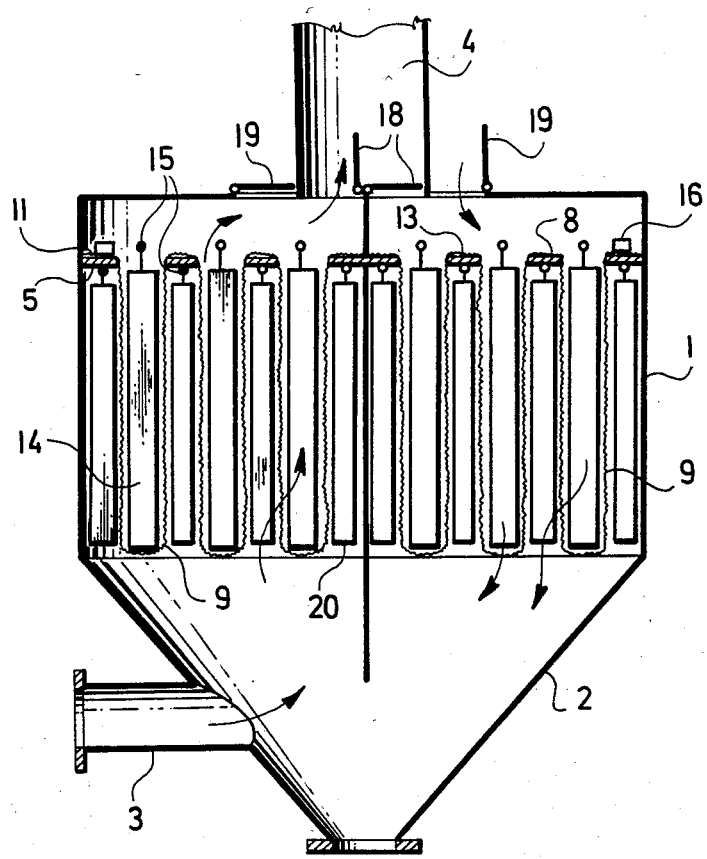
FIG. 1 is a cross section through a two-chamber filter.
Figure 3:
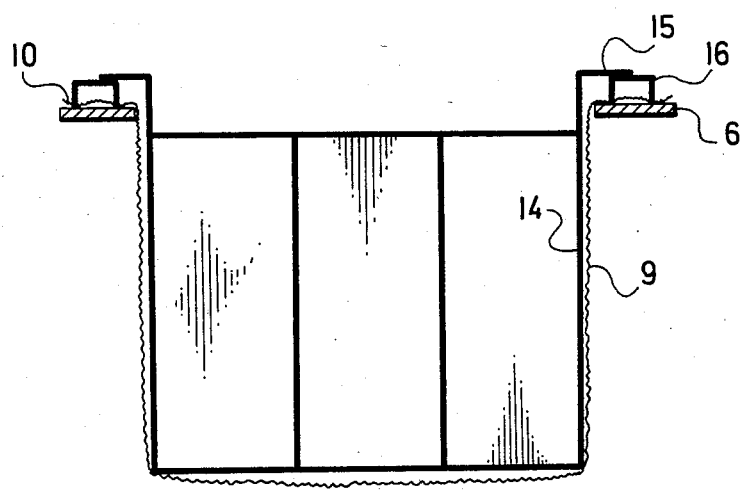
FIG. 3 is a longitudinal section through a filter pocket.

Turning first to FIG. 1, the illustrative two-chamber filter consists of a case 1 with an outlet duct 4 and a dust hopper 2 with an inlet duct 3. A multipocket filter insert 9 is situated in each filter chamber and is attached to a partition wall 5. Single pockets of the filter insert 9 are provided with internal spacers 14 and between the single pockets external spacers 20 are placed. Both the internal spacers 14 and the external spacers 20 are swingingly attached to the partition wall 5. One filter chamber, i.e. the left filter chamber in FIG. 1, is shown in its filtering stage, when the flap 18 on the outlet is in its open position while the flap 19 for scavenging is closed. The second chamber is shown when back-washing the filter with air; in this stage the flap 19 for scavenging is open, while the flap 18 on the outlet is closed.

The multipocket filter insert 9 (see FIG. 2) is made of a single band of a knitted fabric connected by seams 12 running along the lateral borders of the pockets vertically upwards where they are turned through 90° to horizontal longitudinal packing sleeves 11. Transverse packing sleeves 10 are formed from both ends of the knitted fabric band. Single pockets are inserted in the openings 7 of the partition wall 5 while both the longitudinal packing sleeves 11 and the transverse pakcing sleeves 10 rest on marginal surfaces 6 of the partition wall 5 and are fixed to them by means of a pressure sealing frame 16.

The horizontal connecting parts 13 between single pockets of the filter insert 9 rest freely on the internal surfaces 8 of the partition wall 5. The width of the internal surfaces 8 is in the range of 2 cm to 8 cm. The swing clamping of the internal spacer 14 is swingingly attached to the pressure sealing frame 16 pressed to the longitudinal packing sleeves 11 on the marginal surfaces 6 of the partition wall 5. This clamping makes possible a swinging movement of the internal spacer 14 together with the pocket, and at the same time it prevents the vertical shifting of the internal spacer 14 during filtration and regeneration.

FIG. 4 shows swingingly suspended internal spacers 14 and external spacers 20 as well as the multipocket filter insert 9 and the partition wall 5 after a certain time of operation. During this time, the stretch of the pocket vertical walls has been automatically compensated for by a compact dust layer 17 originating in the gaps between the internal surfaces of the partition wall 5 and the connecting parts 15 of the filter insert 9.

The multipocket filter insert 9 is made of a knitted fabric comprising a ground cloth provided with a fibrous fleece at least on the filter insert inlet side. The weight of the needle fabric (the square weight) is usually in the range from 300 to 900 g/m².

The ground cloth is made either from synthetic fibers or glass fibers. Synthetic fibers are designated for temperatures up to 350° C. Particularly suitable synthetic fibers are: polyester fibers for their price and heat stability to 150° C., polypropylene fibers for their high chemical resistance, polyacrylonitrile fibers for their hydrolytic resistance, or aromatic polyamide fibers for their heat stability up to 220° C.

The fibrous fleece consists of staple fibers made from polyester and/or polypropylene and/or polyacrylonitrile and/or aromatic polyamide and/or glass. In some case, e.g. for filters for the grain milling industry or for fodder mixture production, hydrophylic fibers, e.g. cotton, woll, viscose fibers, are recommended as an addition to synthetic fibers.

The knitted fabric is provided with a smooth permeable layer of amorphous synthetic polymeric material at least on the filter insert inlet side. According to a preferred example, the layer may vary on its internal side from an amorphous arrangement to the form of synthetic fibers creating at least a part of the knitted fabric structure. For instance, if the fleece is made of a mixture of synthetic fibers and wool, then synthetic fibers form a part of the needled fabric structure. The smooth permeable layer is formed by heat melting of synthetic fibers on the surface of the needled fabric. In the second case, the smooth permeable layer is obtained by the laminating of a microporous polytetrafluoroethylene sheet to the needled fabric surface.

The multipocket filter insert and its arrangement in an industrial filter according to the invention makes possible the effective separation of solid particles from a streaming gaseous medium practically in all industrial branches. It may be used for industrial filters with regeneration carried out not only by ambient air or cleaned gaseous medium scavenging, but also by pressure air back-washing and eventually by other regeneration methods. A simple automatic compensation of the filter insert stretch permits using even filter materials with relatively high elongation. A simple design and assembling with minimal connecting seam length as well as quick mounting and dismantling of the filter insert in a filter are other advantages of the invention.

Long-lasting operation tests with industrial filters according to the invention have been already mentioned. One of such tested installations was an industrial filter for dust removal in fodder mixture production. It was equipped with four multipocket filter inserts made of polyester fibers with a weight of 300 g/m² and a total filtering area of 100 m². Both the internal and the external spacers were swingingly suspended. After 14,550 hours of operation, the filter achieved an outlet dust concentration of 0.0272 mg/m³ with a pressure loss of 1,560 Pa. The filter pockets were continuously automatically tensioned by the dust layer which was created and which gradually increased between the horizontal internal surfaces of the partition wall and the connecting parts of the filter insert. After 14,550 hours of operation the compensation of the knitted fabric stretch amounted to 4%. The filter requires no maintenance, and no defect arose during operation tests.

Operation tests were performed with another industrial filter according to the invention; it was used for dedusting a workshop in a factory for furniture manufacture. The filtration plant was equipped with multipocket filter inserts made of polyester fibers with a weight of 800 g/m². The spacers were suspended on the partition wall whose horizontal surface width was 4 cm; the air volume was 59,600 m³/h, the pressure loss was 864 Pa. and the outlet dust concentration was 0.078 mg/m³. Cleaned warm air was returned to the workshop space which resulted in energy savings during the winter season. The knitted fabric stretching that amounted to 1.5% after the compact dust layer created on the horizontal internal surfaces of the partition wall below the connecting parts of the filter insert.

Another industrial filter for dust removal was tested for 30 months in a bulk material bagging line. The filter was equipped with an eight-pocket filter insert made of polypropylene knitted fabric that was fixed by its packing sleeves to the partition wall by means of a pressure sealing frame. Both the internal and the external spacers were swingingly suspended on the partition wall. During the whole testing period the filter insert held itself in a state of tension in consequence of a layer of dust forced into the gaps between the internal surfaces of the partition wall and the connecting parts of the filter insert. Thus the dust layer compensated for the stretch of the vertical walls of the pocket which achieved 3.6 cm, i.e. 3% of the pocket total length. After 30 months, the outlet dust concentration was 0.00254 mg/m$^2$ with the volume of gaseous medium of 2,900 m$^3$/h, a filtering area of 25 m$^2$, and a pressure loss of 769 Pa. In the winter season, cleaned warm iar was returned to the working space.

The filter insert inlet sides of all above mentioned tested industrial filters were provided with the smooth permeable layer of amorphous synthetic polymeric material formed by heat melting synthetic fibers on the surface of the knitted fabric.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. Industrial filter for separating solid particles from a streaming gaseous medium, comprising a multipocket filter insert with inlet and outlet sides comprising a single band of a knitted fabric folded into a number of flat pockets, two longitudinal packing sleeves and two transverse packing sleeves as well as connecting parts between single pockets, the resulting multipocket filter insert being provided with a smooth permeable layer of amorphous synthetic polymeric material on the whole surface at least of one of its sides both the longitudinal and the transverse pakcing sleeves of the multipocket filter insert being fixed to marginal surfaces of a partition wall of the filter by means of a pressure sealing frame, the connecting parts of the multipocket filter insert slidingly resting by their smooth permeable layer of amorphous synthetic polymeric material against the horizontal internal surfaces of the partition wall, the flat pockets being inserted on by one in each opening of a partition wall which is provided with internal spacers, between the single flat pockets there being external spacers, both the internal and the external spacers being swingingly suspended or attached to the partition wall by means of suspension elements.

2. An industrial filter as claimed in claim 1, wherein the internal surfaces of the partition wall have a width from 2 cm up to 8 cm.

3. An industrial filter as claimed in claim 1 wherein the multipocket filter insert is formed from a knitted fabric consisting of a ground cloth provided with a fibrous fleece at least on the filter insert inlet side, a smooth permeable layer of amorphous synthetic polymeric material being created at least on the inlet side surface of the filter insert.

4. An industrial filter as claimed in claim 1, wherein the smooth permeable layer of amorphous synthetic polymeric material ranges on its internal side from the amorphous state to the form of synthetic fibers creating at least a part of the needled fabric structure of the filter insert, the smooth permeable layer being chosen from the group consisting of polyester, polyproplylene, polyacrylonitrile, and aromatic polyamide.

5. An industrial filter as claimed in claim 1, wherein the smooth permeable layer of amorphous synthetic polymeric material is formed by a polytetrafluoroethylene sheet fixed to the needled fabric surface.

6. An industrial filter as claimed in claim 1, wherein the ground cloth is created from threads chosen from the group consisting of polyester, polypropylene, polyacrylonitrile, aromatic polyamide, and glass, the fibers being in staples or endless form.

7. An industrial filter according to claim 6, wherein the filters are in staple form.

8. An industrial filter according to claim 6, wherein the fibers are in endless form.

* * * * *